US012782101B2

(12) United States Patent
Garner

(10) Patent No.: US 12,782,101 B2
(45) Date of Patent: Nov. 3, 2026

(54) SYSTEM AND METHOD FOR MEASURING FISH

(71) Applicant: Joshua Garner, Grand Rapids, MN (US)

(72) Inventor: Joshua Garner, Grand Rapids, MN (US)

( * ) Notice: Subject to any disclaimer, the term of this patent is extended or adjusted under 35 U.S.C. 154(b) by 302 days.

(21) Appl. No.: 18/766,163

(22) Filed: Jul. 8, 2024

(65) Prior Publication Data

US 2026/0009630 A1 Jan. 8, 2026

(51) Int. Cl.
*G01B 5/02* (2006.01)
*A01K 29/00* (2006.01)
*A01K 99/00* (2006.01)

(52) U.S. Cl.
CPC ................ *G01B 5/02* (2013.01); *A01K 29/00* (2013.01); *A01K 99/00* (2013.01)

(58) Field of Classification Search
CPC ........... A01K 29/00; A01K 99/00; G01B 3/04
See application file for complete search history.

(56) References Cited

U.S. PATENT DOCUMENTS

| | | | | |
|---|---|---|---|---|
| 5,339,532 A * | 8/1994 | O'Keefe | A01K 61/90 | D10/70 |
| 5,526,575 A * | 6/1996 | Hoover | G01B 3/02 | 33/549 |
| 5,637,838 A * | 6/1997 | Arey | G01B 3/08 | 177/4 |
| 6,415,521 B1 * | 7/2002 | Schnell | A01K 97/00 | 33/549 |
| 6,765,155 B1 * | 7/2004 | Gray | G01G 19/60 | 33/549 |
| 6,959,499 B2 * | 11/2005 | Bini | A01K 97/00 | 33/511 |
| 7,191,536 B1 * | 3/2007 | Bailey | A01K 61/90 | 33/549 |
| 7,665,220 B1 * | 2/2010 | Gee | G01B 3/10 | 33/511 |

(Continued)

FOREIGN PATENT DOCUMENTS

| | | | | |
|---|---|---|---|---|
| CN | 209279837 U | * 8/2019 | | |
| KR | 20250161803 A | * 11/2025 | G01B 5/02 | |

*Primary Examiner* — Yaritza Guadalupe-Mccall
(74) *Attorney, Agent, or Firm* — Uradnik Law Firm PA

(57) ABSTRACT

A system and method for measuring the length of a fish includes a plurality of board segments, each of a predetermined size, that are hingedly joined to form a fish measuring board. The segments are shaped so that the fish measuring board may be rolled or otherwise folded along its length into a compact form. In one particular embodiment, the fish measuring board may be rolled or otherwise folded in one direction only. In one embodiment, the fish measuring board includes a nose segment including a vertical barrier against which the nose of a fish may be placed during measuring. The measuring board may include a predetermined number of segments that together correspond in length to a desired species of fish. Each segment also may be sized so that a measuring board includes a predetermined width that corresponds to a desired species of fish. The board may include fish-length markers along its length, and predetermined segment(s) may be colored to show, or otherwise indicate, a desired fish slot length.

9 Claims, 6 Drawing Sheets

(56) References Cited

U.S. PATENT DOCUMENTS

| | | | | | |
|---|---|---|---|---|---|
| 8,141,262 | B1 * | 3/2012 | Lee | A01K 97/00 | 33/549 |
| 10,598,474 | B1 * | 3/2020 | Petrash | G01B 3/002 | |
| 11,357,222 | B2 * | 6/2022 | Weskamp | G01B 3/06 | |
| 11,733,017 | B2 * | 8/2023 | Weskamp | G01B 3/08 | 33/511 |
| 12,590,789 | B2 * | 3/2026 | Crawford | A01K 99/00 | |
| 2004/0163267 | A1 * | 8/2004 | Bini | A01K 97/00 | 33/511 |
| 2012/0324751 | A1 * | 12/2012 | Wakeman | A01K 97/00 | 33/759 |
| 2017/0000099 | A1 * | 1/2017 | Wanke | A01K 97/00 | |
| 2018/0035655 | A1 * | 2/2018 | Callingham | A01K 97/00 | |
| 2026/0009630 | A1 * | 1/2026 | Garner | G01B 5/02 | |

* cited by examiner

SYSTEM AND METHOD FOR MEASURING FISH

FIELD OF THE DISCLOSURE

The invention relates generally in one embodiment to a system and method for measuring fish, and more particularly, to an elongated, full-length measuring board including a number of joined segments, each segment of a predetermined length, that may be rolled or otherwise folded into a compact configuration for storage.

BACKGROUND

Fisherman often desire to measure the length of their fish, preferably in a boat while fishing. Knowing the length of a fish can help a fisherman gauge its size and weight. Also, knowing the length of a fish allows the fisherman to determine whether the fish may be kept in view of certain regulations governing fish length. Generally known as "slot limits," such regulations place restrictions on the number of fish that may be kept of a certain length. For example, a particular state may require that for a particular species of fish only one may be possessed over a certain length limit (e.g., one walleye over 25 inches long).

The situation with slot limits can be complicated for a fisherman. For instance, different states, or even different lakes, may have different slot limits for a particular species of fish. Also, different species of fish grow to different lengths and have different slot limits.

Wooden or plastic measuring boards, in which a fish is placed on the board to determine its length, are typically used to measure fish. There is, however, limited space available in boats to store fish measuring boards, particularly boards 36 inches in length or longer. Also, it would be helpful if a measuring board roughly correlated with the size of the fish sought. It is unwieldy to carry a 60-inch measuring board when the species of fish sought rarely (or never) grows to 30 inches in length. Thus, fisherman often need to carry multiple fish measuring boards for different species of fish.

Some fisherman use tape measures to determine a fish's length. However, tape measures are not without their drawbacks. It is difficult to place a fish on a measuring tape because the tape typically is not as wide as a fish. Also, it is difficult to align the nose of a fish with the start of a measuring tape. This is particularly true when the fish is flopping around.

Accordingly, an improved system and method for measuring fish is required.

SUMMARY

The present disclosure in one embodiment provides a system and method for measuring fish. In one embodiment, a plurality of board segments, each of a predetermined size, are hingedly joined to form a fish measuring board. The segments are shaped so that the fish measuring board may be rolled or otherwise folded along its length into a compact form. In one particular embodiment, the fish measuring board may be rolled or otherwise folded in one direction only. In one embodiment, the fish measuring board includes a nose segment including a vertical barrier against which the nose of a fish may be placed during measuring. The measuring board may include a predetermined number of segments that together correspond in length to a desired species of fish. Each segment also may be sized so that a measuring board includes a predetermined width that corresponds to a desired species of fish.

Other benefits and advantages of the present disclosure will be appreciated from the following detailed description.

Figure 2:
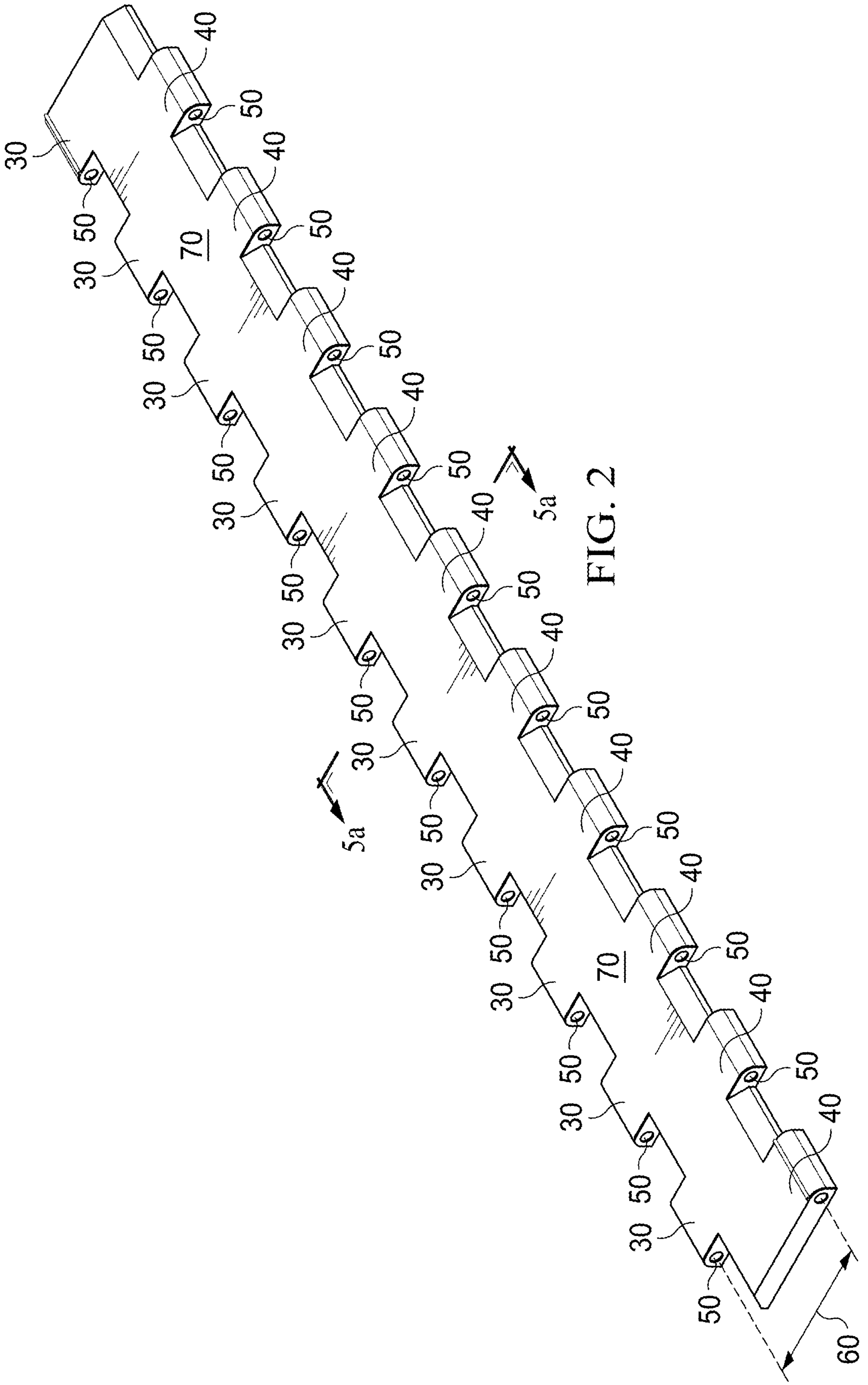
FIG. 2 is a perspective view from above of an exemplary body segment for use in an exemplary measuring board according to the description herein.
Figure 3:
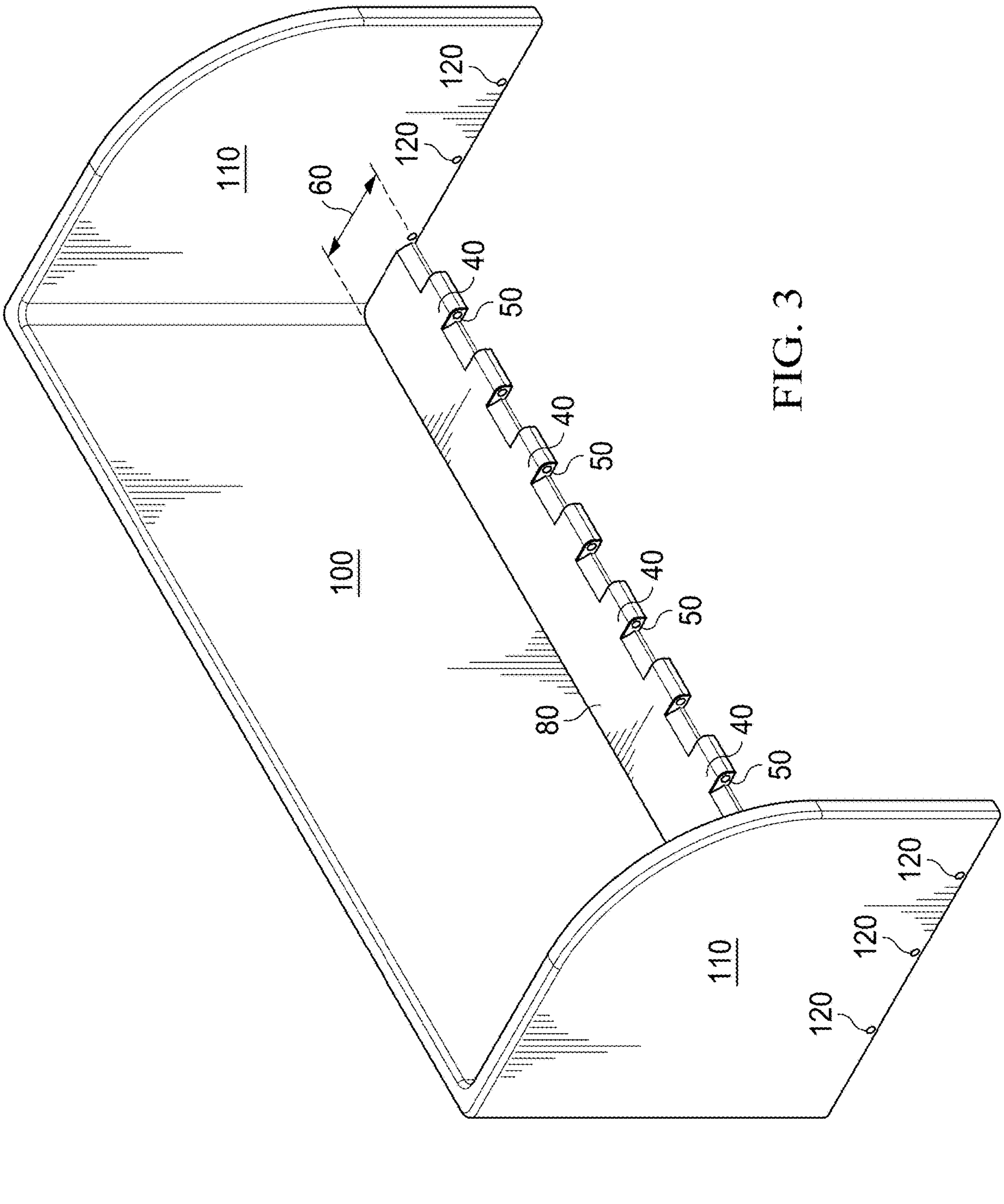
FIG. 3 is a perspective view from above of an exemplary nose segment for use in an exemplary measuring board according to the description herein.

FIG. **5*a* is a cross-sectional view of an exemplary body segment taken along the line 5*a*-5*a* in FIG. 2**.

Figure 1:
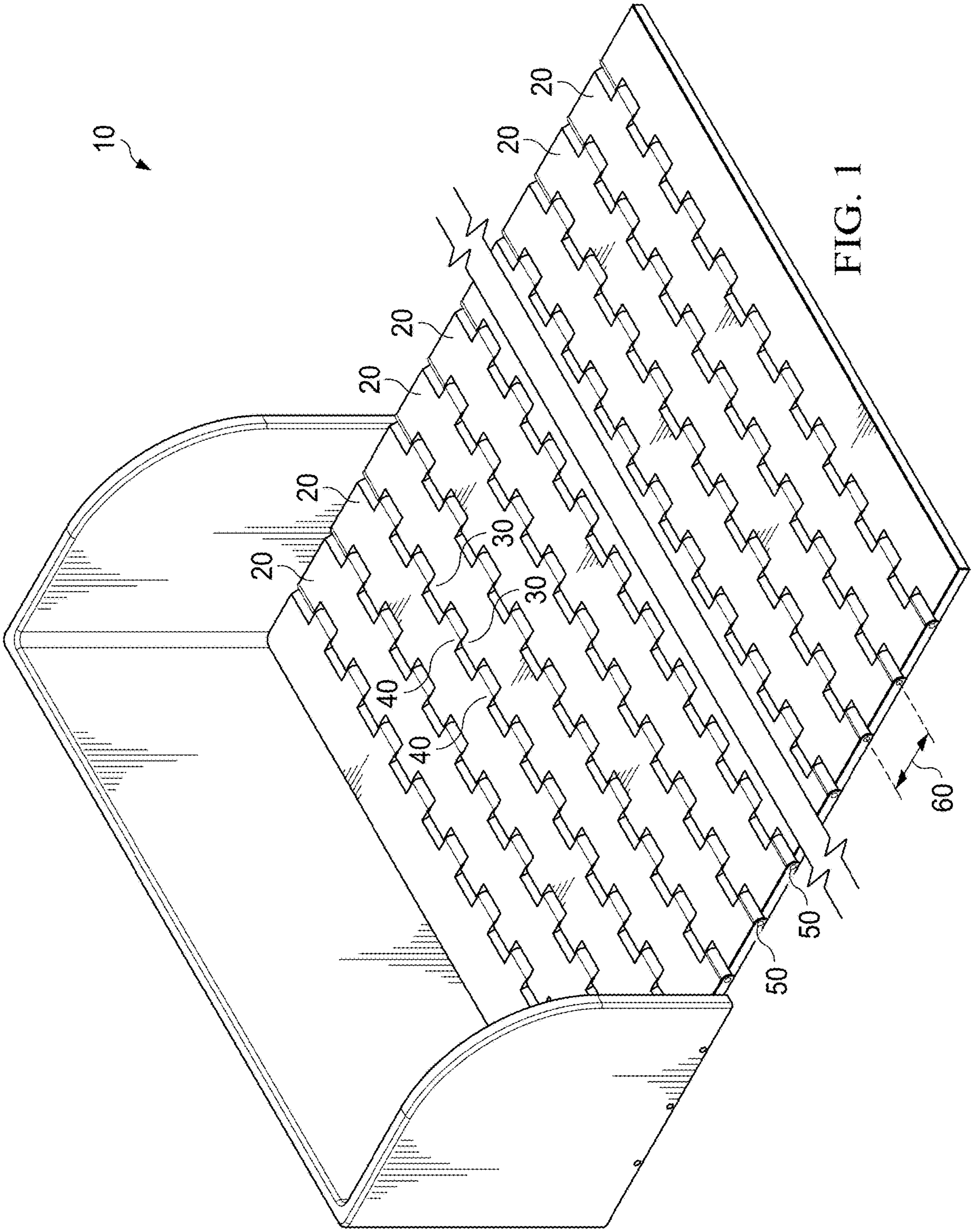
FIG. 1 is a perspective view from above of an exemplary measuring board in a deployed configuration for measuring fish length, according to the description herein.

FIG. **5*b* is a perspective view from above of the exemplary measuring board as shown in FIG. 1**, in a partially rolled or folded configuration, according to the description herein.

DETAILED DESCRIPTION

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to fish measurement; etc. Such aspects related to this disclosure do not depart from the invention, and it is therefore intended that the invention not be limited by the certain aspects set forth of the events and circumstances related to this disclosure.

Turning to the drawings, an exemplary fish measuring board 10 is shown in a deployed configuration in FIG. 1. The board 10 includes a plurality of board segments 20. As shown in FIG. 2, each board segment 20 includes a plurality of tabs 30 on the proximal side of the segment 20 and a plurality of tabs 40 on the distal side of the segment 20. Each tab 30, 40 includes a hole 50 extending laterally therethrough. When adjacent board segments 20 are brought together, each tab 30 fits within the space next to a tab 40, and the holes 50 in tabs 30, 40 align. Then, a metal wire or pin may be placed through the holes 50 in tabs 30, 40 to secure adjacent segments 20 together in a hinged fashion.

Each segment 20 has a predetermined length 60 between the axis of the hole 50 in tab 30 and the axis of the hole 50 in tab 40. In one embodiment, the predetermined length 60 is one inch. In one embodiment, the upper surface 70 of each segment 20 may include measurement markers. For example, the upper surface 70 may be etched with dash marks to indicate ¼-inch intervals along the length 60. Other means of providing measurement markers also may be used, e.g., stickers applied to surface 70, markers molded into or 3-D printed on the surface 70, etc.

At the proximal end of the fish measuring board 10 a nose segment 80 is provided. In one embodiment, the nose segment 80 resembles in part each segment 20 in that (i) it has the same predetermined length 60 as the body segments 20; and (ii) the nose segment 80 includes on its distal side tabs 40. On its proximal side, the nose segment 80 includes a vertical barrier 100. The barrier 100 is disposed so that the nose of a fish may be placed against the barrier 100 when the fish is laid out on the measuring board 10. The nose segment 80 also may include one or more side barriers 110 that run along a portion of the length of the board 10 starting from the barrier 100. Where side barriers 110 are used, the side barriers 110 may include one or more holes 120 that permit the joining of adjacent segments 80 and 20 and adjacent body segments 20.

Figure 4:
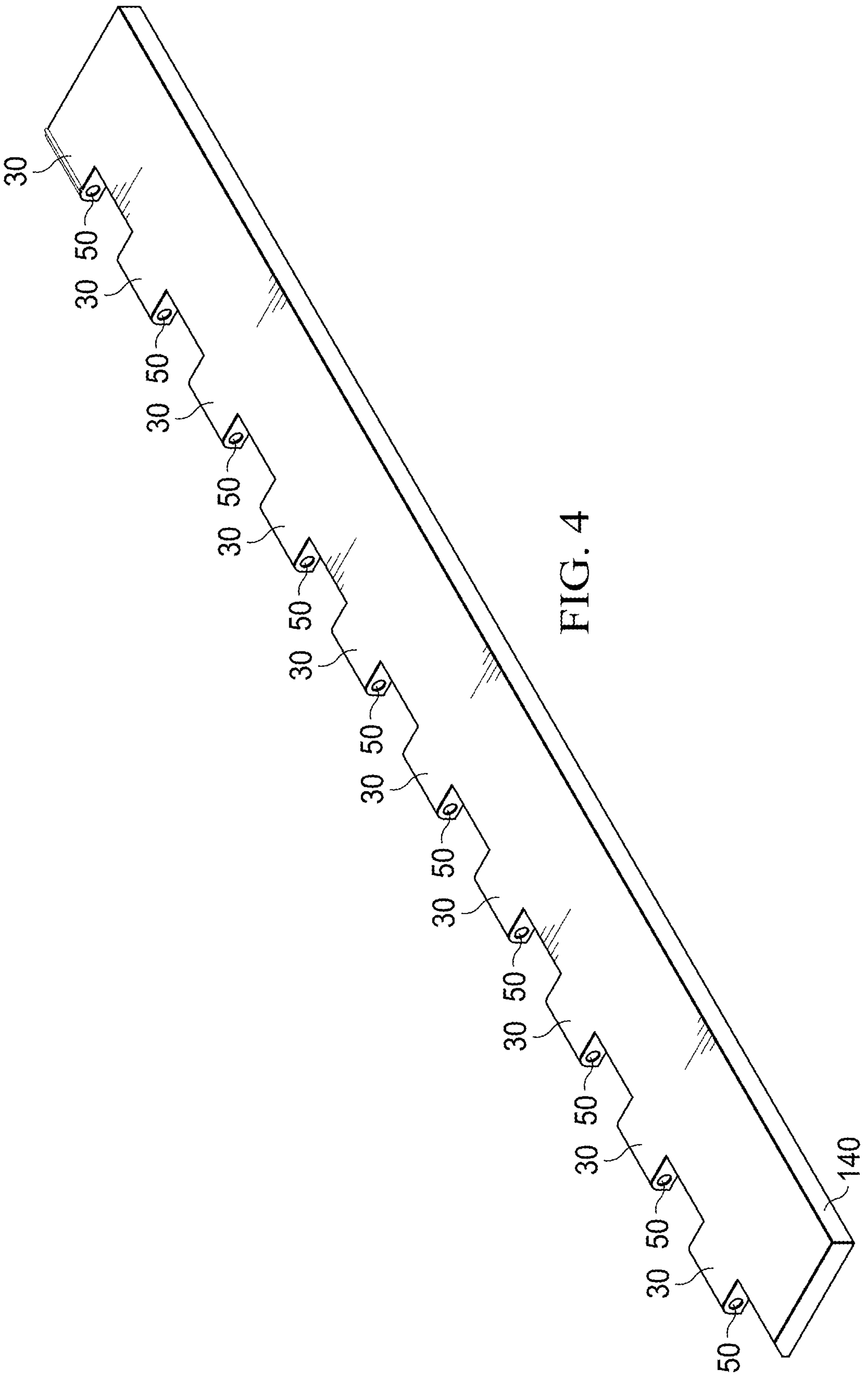
FIG. 4 is a perspective view from above of an exemplary end segment for use in an exemplary measuring board according to the description herein.

On the distal end of the measuring board 10 an end segment 130 may be provided. See FIG. 4. The distal end 140 of the end segment 130 may be finished without any tabs. The proximal end of end segment 130 may (like segments 20) include tabs 30 and holes 50 therethrough. The end segment 130 is hingedly joined to its adjacent segment 20 with a wire or pin placed through holes 50.

Figure 5A:
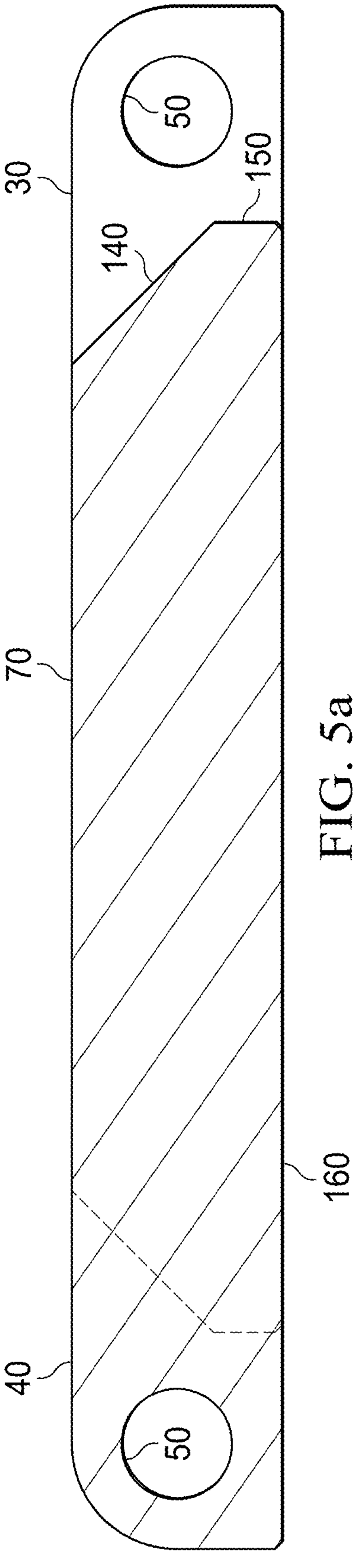
Figure 5B:
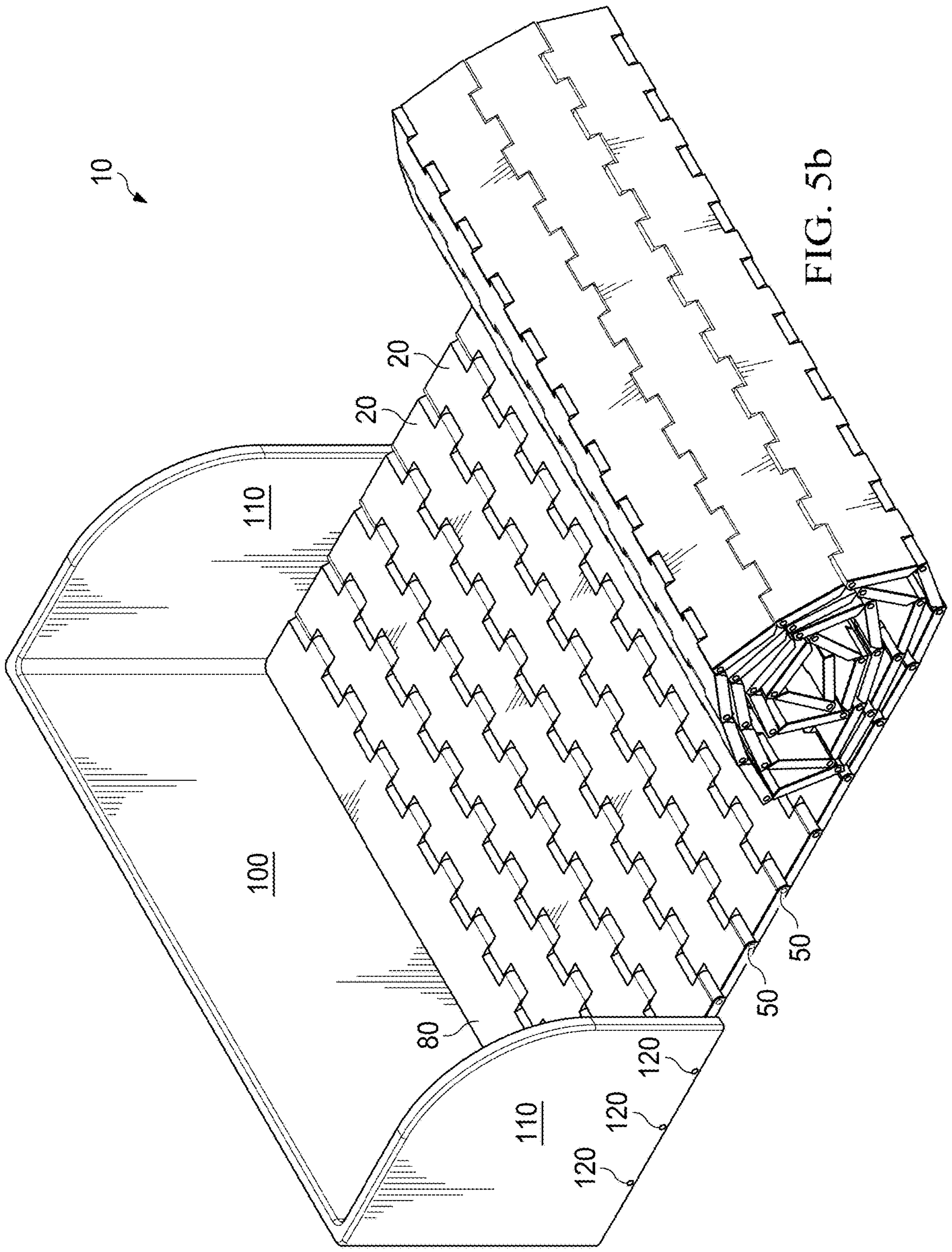

In one embodiment, between adjacent tabs 30 is a segment portion that includes an upper surface 70, a bottom surface 160, a sloped surface 140, and a vertical surface 150. A similar arrangement of surfaces may be provided between adjacent tabs 40. See FIG. 5*a*. This arrangement of surfaces permits the board 10 to be rolled or folded in one direction. See FIG. 5*b*. Vertical surface 150 prevents the board 10 from being folded in an opposite direction than that shown in FIG. 5*b*, because when attempting to roll or fold the board 10 in that opposite direction a portion of the tabs 30, 40 will abut each vertical surface 150. In that way, the vertical surface 150 acts as a stop.

The board 10 may be configured of any desired length and width that roughly correlates with the size of the fish being measured. The measuring board 10 may be equipped with a body segment 20 that is colored to indicate a desired slot limit length. The board 10 also may be equipped with a plurality of adjacent colored body segments 20 to indicate a desired range of fish lengths. To measure a fish, the board 10 may be placed in a deployed configuration, and a fish placed upon the board 10 so that the nose of the fish touches barrier 100. Then, the length of the fish can be read at the tip of the tail of the fish.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of examples and described in detail herein. However, it should be understood that the invention is not intended to be limited to the particular forms disclosed. Rather, the invention is to cover all modifications, equivalents and alternatives falling within the spirit and scope of the invention.

What is claimed is:

1. A fish measuring board including a plurality of body segments, each body segment including a proximal side and distal side, the proximal side including a plurality of proximal tabs extending proximally therefrom and the distal side including a plurality of distal tabs extending distally therefrom, wherein each proximal tab and each distal tab includes a hole laterally therethrough;

wherein adjacent body segments of the board include at least one distal tab of a first body segment along side at least one proximal tab of a second body segment so that the holes in the at least one distal tab and in the at least one proximal tab align; and wherein a pin is placed through the aligned holes of the at least one distal tab and the at least one proximal tab to form a hinged connection between the adjacent body segments.

2. The fish measuring board of claim 1, wherein the pin is a wire.

3. The fish measuring board of claim 1, wherein each body segment includes an upper surface including marks spaced along the upper surface to indicate a length along the board.

4. The fish measuring board of claim 3, wherein each body segment includes a plurality of distal tabs and a plurality of proximal tabs, and including a body segment portion adjacent a distal tab that includes a sloped surface extending between the upper surface and a vertical surface on the distal side of the body segment.

5. The fish measuring board of claim 4, including a body segment portion adjacent a proximal tab that includes a sloped surface extending between the upper surface and a vertical surface on the proximal side of the body segment.

6. The fish measuring board of claim 5, including a nose segment at the proximal end of the board.

7. The fish measuring board of claim 6, wherein the nose segment includes on its proximal side a vertical barrier against which the nose of a fish may be placed when the fish is disposed upon the board.

8. The fish measuring board of claim 7, wherein a predetermined body segment is placed at a predetermined length from the vertical barrier, the predetermined length corresponding to a predetermined fish species slot limit.

9. The fish measuring board of claim 7, wherein a plurality of adjacent body segments indicate a predetermined range of lengths from the vertical barrier.

* * * * *